(12) United States Patent
Masepohl

(10) Patent No.: US 7,839,966 B1
(45) Date of Patent: Nov. 23, 2010

(54) ASYNCHRONOUS DATA SAMPLING USING CDR RECEIVERS IN LOCK-TO-REFERENCE MODE

(75) Inventor: Scott Masepohl, Arvada, CO (US)

(73) Assignee: Altera Corporation, San Jose, CA (US)

(*) Notice: Subject to any disclaimer, the term of this patent is extended or adjusted under 35 U.S.C. 154(b) by 763 days.

(21) Appl. No.: 11/048,373

(22) Filed: Feb. 1, 2005

(51) Int. Cl.
*H04L 7/02* (2006.01)
(52) U.S. Cl. .................................. 375/371
(58) Field of Classification Search ......... 375/311–215, 375/219, 222, 224–228, 354–356, 362, 365, 375/366, 371, 373, 376, 377, 211, 213, 214; 702/1, 57, 66–84, 117–121, 108; 370/464, 370/498, 503, 516; 327/100, 144–147, 155, 327/156, 172–175; 714/744, 738, 724, 699; 365/189.01, 189.02; 713/500–503, 600
See application file for complete search history.

(56) References Cited

U.S. PATENT DOCUMENTS

| | | | | |
|---|---|---|---|---|
| 5,548,249 | A * | 8/1996 | Sumita et al. | 331/1 A |
| 5,787,114 | A * | 7/1998 | Ramamurthy et al. | 375/221 |
| 6,314,145 | B1 * | 11/2001 | van Driest | 375/326 |
| 6,463,092 | B1 * | 10/2002 | Kim et al. | 375/219 |
| 6,480,315 | B1 * | 11/2002 | Brown | 398/202 |
| 6,483,886 | B1 | 11/2002 | Sung et al. | |
| 6,650,140 | B2 * | 11/2003 | Lee et al. | 326/39 |
| 6,724,328 | B1 * | 4/2004 | Lui et al. | 341/101 |
| 6,854,044 | B1 | 2/2005 | Venkata et al. | |
| 6,952,431 | B1 * | 10/2005 | Dally et al. | 370/516 |
| 7,133,648 | B1 * | 11/2006 | Robinson et al. | 455/88 |
| 7,143,323 | B2 * | 11/2006 | Sweet | 714/724 |
| 7,224,951 | B1 * | 5/2007 | Chuang et al. | 455/260 |
| 2001/0033188 | A1 | 10/2001 | Aung et al. | |
| 2003/0052709 | A1 | 3/2003 | Venkata et al. | |
| 2004/0131058 | A1 * | 7/2004 | Ghiasi | 370/389 |
| 2004/0236977 | A1 * | 11/2004 | Kizer et al. | 713/500 |
| 2005/0028050 | A1 * | 2/2005 | Ganry | 714/700 |
| 2005/0111536 | A1 * | 5/2005 | Cranford et al. | 375/226 |
| 2005/0228605 | A1 * | 10/2005 | Ribo | 702/108 |
| 2005/0286669 | A1 * | 12/2005 | Buchwald et al. | 375/356 |
| 2006/0107154 | A1 * | 5/2006 | Bansal et al. | 714/738 |

OTHER PUBLICATIONS

Kossel et al., "Jitter Measurements of High-Speed Serial Links", IEEE Design and Test of Computers, vol. 21, Issue 6, Nov.-Dec. 2004, pp. 536-543.*

(Continued)

*Primary Examiner*—David C Payne
*Assistant Examiner*—Vineeta S Panwalkar
(74) *Attorney, Agent, or Firm*—Ropes & Gray LLP; Robert R. Jackson

(57) ABSTRACT

Sampling and analysis of input data is implemented within the programmable logic resource without using external equipment. CDR circuitry can be set to reference clock mode. In this mode, a reference clock signal is multiplied by a factor to generate a sample rate. The sample rate is divided by another factor, the desired width of the sampled data, to generate an output clock. The input data is sampled at the sample rate and sent to core circuitry based on the output clock. Dedicated circuitry in the core circuitry is configured to perform analysis on the sampled data.

12 Claims, 7 Drawing Sheets

OTHER PUBLICATIONS

U.S. Appl. No. 10/059,014, filed Jan. 29, 2002, Lee et al.
U.S. Appl. No. 10/273,899, filed Oct. 16, 2002, Venkata et al.
U.S. Appl. No. 10/349,541, filed Jan. 21, 2003, Venkata et al.
U.S. Appl. No. 10/454,626, filed Jun. 3, 2003, Lui et al.
U.S. Appl. No. 10/637,982, filed Aug. 8, 2003, Venkata et al.
U.S. Appl. No. 10/668,900, filed Sep. 22, 2003, Asaduzzaman et al.
U.S. Appl. No. 10/713,877, filed Nov. 13, 2003, Churchill et al.
U.S. Appl. No. 10/741,593, filed Dec. 18, 2003, Kabani et al.
Altera Corporation, "Using Source-Synchronous Signaling with DPA in Stratix GX Devices," Application Note 236, Version 1.0, Nov. 2002, pp. 1-18.

* cited by examiner

ASYNCHRONOUS DATA SAMPLING USING CDR RECEIVERS IN LOCK-TO-REFERENCE MODE

BACKGROUND OF THE INVENTION

This invention relates to data sampling and analysis. More particularly, this invention relates to implementing data sampling and analysis within a programmable logic resource.

Programmable logic resource technology is well known for its ability to allow a common hardware design (embodied in an integrated circuit) to be programmed to meet the needs of many different applications. Known examples of programmable logic resource technology include programmable logic devices (PLDs), complex programmable logic devices (CPLDs), erasable programmable logic devices (EPLDs), electrically erasable programmable logic devices (EEPLDs), field programmable gate arrays (FPGAs), application-specific standard products (ASSPs), and application-specific integrated circuits (ASICs).

To facilitate the use of programmable logic resources in certain applications, intellectual property (IP) blocks are coupled to programmable logic resource core circuitry. In one application, an IP block is a block of logic or data that supports a multi-channel communications protocol such as high speed serial interface (HSSI) communications. HSSI communications include (1) industry-standard forms such as XAUI, PCI Express, InfiniBand (IB), Fibre Channel (FC), Gigabit Ethernet, Packet Over SONET or POS-5, Serial Rapid I/O, etc., and (2) any of a wide range of non-industry-standard or "custom" forms that particular users devise for their own uses. Such custom protocols often have at least some features similar to industry-standard protocols, but deviate from industry standards in other respects. In a multi-channel communications protocol, data transfers to and from the programmable logic resource core circuitry and the IP block over multiple channels.

An increasingly important type of signaling between devices is "clock data recovery" or "CDR" signaling. In CDR signaling, the clock signal information is embedded in a serial data stream so that no separate clock signal needs to be transmitted. For example, data may be transmitted serially in "packets" of several successive serial data words preceded by a serial "header" that includes several training bits having a predetermined pattern of binary ones and zeros. The clock signal information is embedded in the data signal by the high-to-low and/or low-to-high transitions in that signal, which must have at least one high-to-low or low-to-high transition within a certain number of clock signal cycles. At the receiver the clock signal is "recovered" from the data signal. The clock signal is then used to recover the data from the data signal.

Analysis is typically performed on the serial data stream by connecting external equipment to the input data pins on the programmable logic resource. The serial data stream is sent as input to equipment such as an oscilloscope, a logic analyzer, or a time interval analyzer (TIA). An oscilloscope is an instrument that displays and analyzes the waveform of analog signals such as voltage or current as a function of time. A logic analyzer is an instrument that displays and analyzes the waveform of digital signals such as voltage or current as a function of time. A TIA is an instrument that measures the time interval between signal pulses. The equipment samples and processes the serial data stream to generate an output signaling, for example, the time between input pulses and the widths of data high or data low pulses. The processed data is then typically sent as input to the programmable logic resource for further processing by the core circuitry.

Performing data stream analysis requires the use of bulky external equipment. Because the equipment is generally not provided with the programmable logic resource, the user of the programmable logic resource is required to have the equipment accessible. In addition, the user is required to manually locate the input data pin on the programmable logic resource, connect the pin to the input of the equipment, and connect the output of the equipment back to the correct pin on the programmable logic resource.

In view of the foregoing, it would be desirable to provide sampling and analysis of data streams within the programmable logic resource without the use of external equipment.

SUMMARY OF THE INVENTION

In accordance with the invention, sampling and analysis of data streams are provided within the programmable logic resource without the use of external equipment.

The clock data recovery (CDR) circuitry, which typically receives a reference clock signal and a CDR data signal, operates in one of two modes of operation: reference clock mode (i.e., lock-to-reference mode) and data mode (i.e., lock-to-data mode). During reference clock mode, the CDR circuitry uses the reference clock signal for a given protocol to produce a recovered clock that is similar in phase and frequency to the phase and frequency of the reference clock signal. During data mode, the CDR circuitry adjusts the phase of the recovered clock to align to the CDR data signal. The phase-adjusted recovered clock is used to recover the clock signal embedded in the CDR data signal, which is then used to recover the data from the CDR data signal. The operation of the CDR circuitry in one of these two modes of operation can be controlled by the binary status of two pins. A reference clock pin can be used to set the CDR circuitry to operate in reference clock mode while a data pin can be used to set the CDR circuitry to operate in data mode.

Data sampling and analysis of data streams can be provided within the programmable logic resource by setting the reference clock pin so that the CDR circuitry operates in reference clock mode. The reference clock pin can be set by a user, by circuitry external to the programmable logic resource, by the core circuitry within the programmable logic resource, or a combination thereof.

Once in reference clock mode, the reference clock signal is sent as input to a phase-locked loop (PLL) circuit which multiplies the reference clock signal by a programmable or predetermined factor. The resulting signal provides the sampling rate at which the CDR data signal is to be sampled at the input pins. The PLL circuit can be programmed to sample at any suitable frequency limited by the frequency range of the receiver. The PLL circuit also divides the sampling rate by another programmable or predetermined factor that represents the desired width of the sampled data. The resulting signal provides the output clock. A clock recovery unit samples the CDR data signal at the sample rate and sends the sampled data to the core circuitry based on the output clock. The core circuitry can have dedicated circuitry configured to perform analysis on the sampled data.

Different types of analysis can be performed on the sampled data. One type of analysis is time interval analysis (TIA) which measures the time interval between pulses. Another type of analysis is detecting the data width to look for patterns in the sampled data. With the detected patterns, finite impulse response (FIR) analysis, infinite impulse response (IIR) analysis, or any other suitable analysis can be performed on the data following the detected pattern.

In another embodiment, oversampling can be performed by utilizing more than one receiver channel to sample the CDR data signal at different phases from each other. The sampled data from each channel can be combined and analyzed by the dedicated circuitry in the core circuitry. Oversampling provides greater accuracy in the analysis.

With the analyzed data, the core circuitry can be configured to perform any suitable action. For example, existing CDR circuitry may not be able to recover data that has a low frequency. In accordance with the invention, oversampling the CDR data signal can provide the core circuitry with enough information to re-align the CDR data signal so that the CDR circuitry is able to accurately recover the data.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
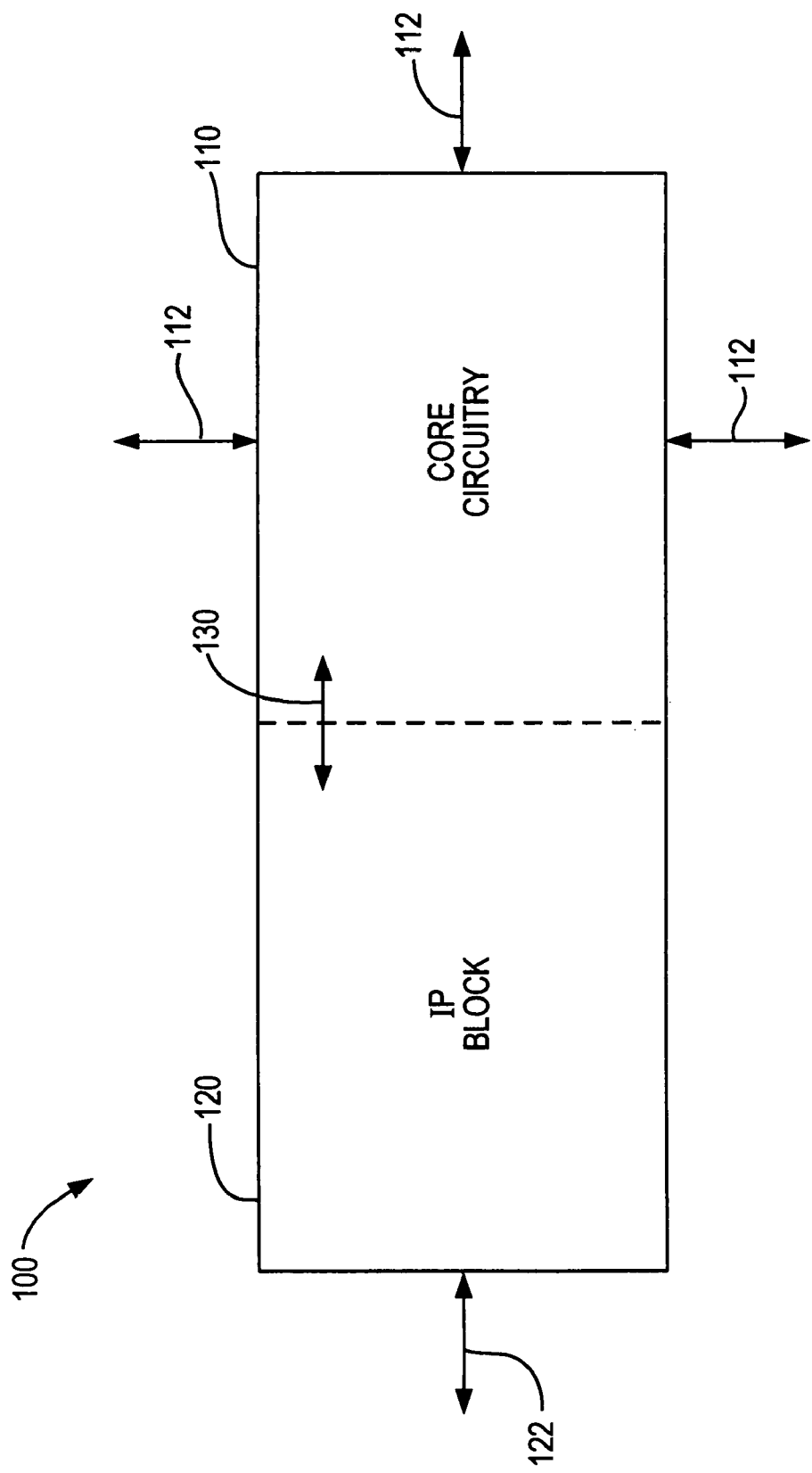
FIG. 1 is a simplified block diagram of an illustrative embodiment of a programmable logic resource.

An illustrative programmable logic resource 100 constructed in accordance with the invention is shown in FIG. 1. Programmable logic resource 100 is an integrated circuit that includes core circuitry 110 and an intellectual property (IP) block 120. Programmable logic resource 100 can be any suitable device such as, for example, a programmable logic device (PLD), a complex programmable logic device (CPLD), an erasable programmable logic device (EPLD), an electrically erasable programmable logic device (EEPLD), a field programmable gate array (FPGA), an application-specific standard product (ASSP), an application-specific integrated circuit (ASIC), a full-custom chip, or a dedicated chip. Core circuitry 110 can be typical programmable logic circuitry of any of several known types and constructions. IP block 120 can be a soft IP block in which circuitry is programmed in as programmable logic. Circuitry is described in terms of gates and interconnections for the gates using a netlist or a hardware description language (e.g., Very High Speed Integrated Circuit Hardware Description Language (VHDL) or Verilog), which can be synthesized with the surrounding logic. In another embodiment, IP block 120 can be a hard IP block in which circuitry is custom-designed in hardware. In yet another embodiment, IP block 120 can be a firm IP block in which circuitry is partly designed in hardware but is configurable for various applications.

In accordance with the invention, IP block 120 is configured to support, for example, a multi-channel communications protocol such as high speed serial interface (HSSI) circuitry. The HSSI circuitry is used to receive one or more high speed serial (HSS) signals via connection(s) 122 and to pass the information thus received on to core circuitry 110 in a form that is more readily usable by the core circuitry. Alternatively or additionally, IP block 120 may be used to output via connection(s) 122 one or more signals indicative of information received from core circuitry 110. Leads 130 are used to convey signals between core circuitry 110 and IP block 120. Core circuitry 110 may also input and/or output other, typically non-IP block, signals via leads 112.

For clarity, the invention is described primarily in the context of IP block 120 having HSSI circuitry. The HSSI standards that the illustrative circuitry shown herein support include, for example, the standards known as PCI-Express and XAUI, and many non-industry-standard protocols that are modifications of the true industry-standard protocols. Some users may sometimes want to devise and employ such variants of industry standards, and many such variants can be supported by the circuitry of this invention. For some standards, the HSSI circuitry may be fully implementable in IP block 120. For other standards, part of the interface may be implemented in IP block 120 and part of the interface may be implemented in PLD core circuitry 110.

Figure 2:
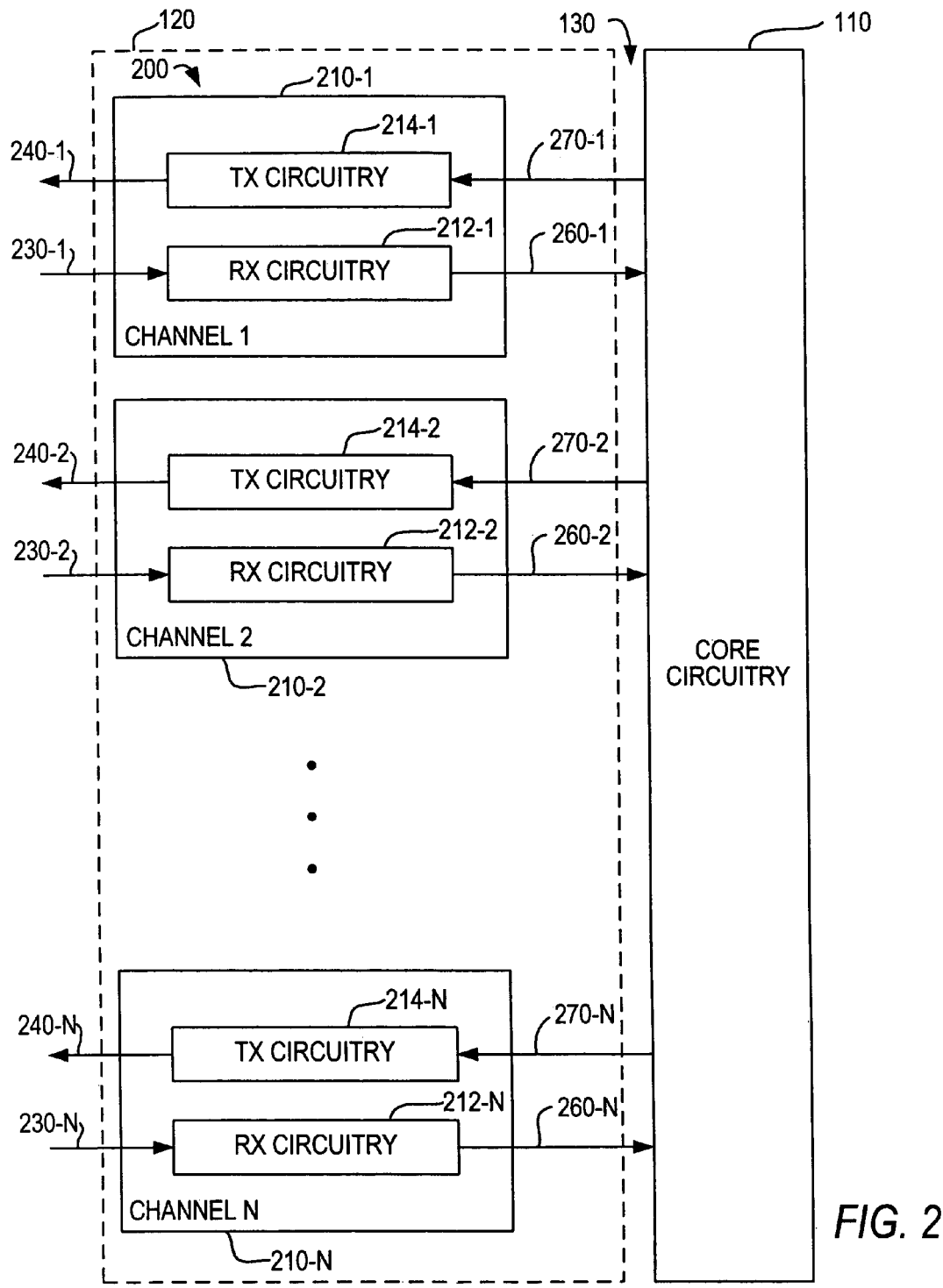
FIG. 2 is a more detailed, but still simplified block diagram of a representative portion of the programmable logic resource shown in FIG. 1.

FIG. 2 shows a partial block diagram of programmable logic resource 100 having HSSI circuitry 200 in IP block 120. HSSI circuitry 200 includes up to N channels 210. The number of channels N may vary depending on the HSSI standard. Each channel 210 includes receiver circuitry 212 and transmitter circuitry 214.

Each receiver circuitry 212 receives data from external circuitry via associated receiver (RX) signal 230 and partly converts the received data to a form more suitable for application to core circuitry 110 via leads 260. For example, each receiver circuitry 212 can receive from external circuitry successive serial bytes of data and can output to core circuitry 110 successive parallel bytes of data.

Each transmitter circuitry 214 receives data from core circuitry 110 via associated lead 270 and partly converts the received data to a form more suitable for application to external circuitry via transmitter signals 240. For example, each transmitter circuitry 214 can receive from core circuitry 110 successive parallel bytes of data and can output to external circuitry successive serial bytes of data.

Although not shown, each data channel 210 receives and/or outputs one data stream via associated drivers. To avoid overcomplicating the drawing, the data streams are shown as being sent over receiver signals 230 and transmitter signals 240. Each driver can be a differential driver because the HSSI standards of interest in connection with the present illustrative embodiment receive and transmit information using differential signaling. Each receiver driver has an associated pair of input pins and each transmitter driver has an associated pair of output pins that couple to receiver circuitry 212 and transmitter circuitry 214, respectively.

CDR circuitry, which is a part of the receiver circuitry, is configured to operate in one of two modes of operation: reference clock mode (i.e., lock-to-reference mode) and data mode (i.e., lock-to-data mode). During reference clock mode, the CDR circuitry typically uses the reference clock signal for a given protocol to produce a recovered clock that is similar in phase and frequency to the phase and frequency of the reference clock signal. During data mode, the CDR circuitry adjusts the phase of the recovered clock to align to the CDR data signal. The phase-adjusted recovered clock is used to recover the clock signal embedded in the CDR data signal, which is then used to recover the data from the CDR data signal.

The CDR circuitry can be programmed to automatically switch between reference clock mode and data mode or alternatively, can be set to operate in reference clock mode or data mode, using two control signals: a lock-to-reference (LTR) signal and a lock-to-data (LTD) signal. For example, when the LTR signal and the LTD signal are both set to logic 0, the CDR circuitry can be directed to automatically switch between reference clock mode and data mode. When the LTR signal to set to logic 1 and the LTD signal is set to logic 0, the CDR circuitry can be directed to operate only in reference clock mode. This can occur, for example, when a new reference clock signal is detected, when a problem is detected during data mode, when data sampling and analysis is to be performed, or at any other suitable time. When the LTR signal is set to logic 0 and the LTD signal to set to logic 1, the CDR circuitry can be directed to operate only in data mode. This can occur, for example, when the recovered clock has been generated or at any other suitable time. As a default, when the LTR signal and the LTD signal are both set to logic 1, the CDR circuitry can be directed to operate only in data mode or other suitable operation. For clarity, the CDR circuitry is primarily described herein as being controlled by two control signals, although any suitable number of signals and combinations of logic values, and any suitable control circuitry, may be used to control operation during reference clock mode and data mode.

The LTR signal and LTD signal can be programmed to be set by the core circuitry in the programmable logic resource, by circuitry external to the programmable logic resource, by user input, or any suitable combination thereof. In one embodiment, the programmable logic resource or external circuitry can be programmed to set the signals to indicate processing in reference clock mode when a new reference clock signal is detected (associated with a new protocol being interfaced), when a problem is detected during data mode, after a predetermined time period in which the CDR circuitry has been in data mode, at periodic time intervals in order to perform data sampling and analysis, or in response to any other suitable time or event. The user can also set the signals in response to any suitable time or event.

Figure 3:
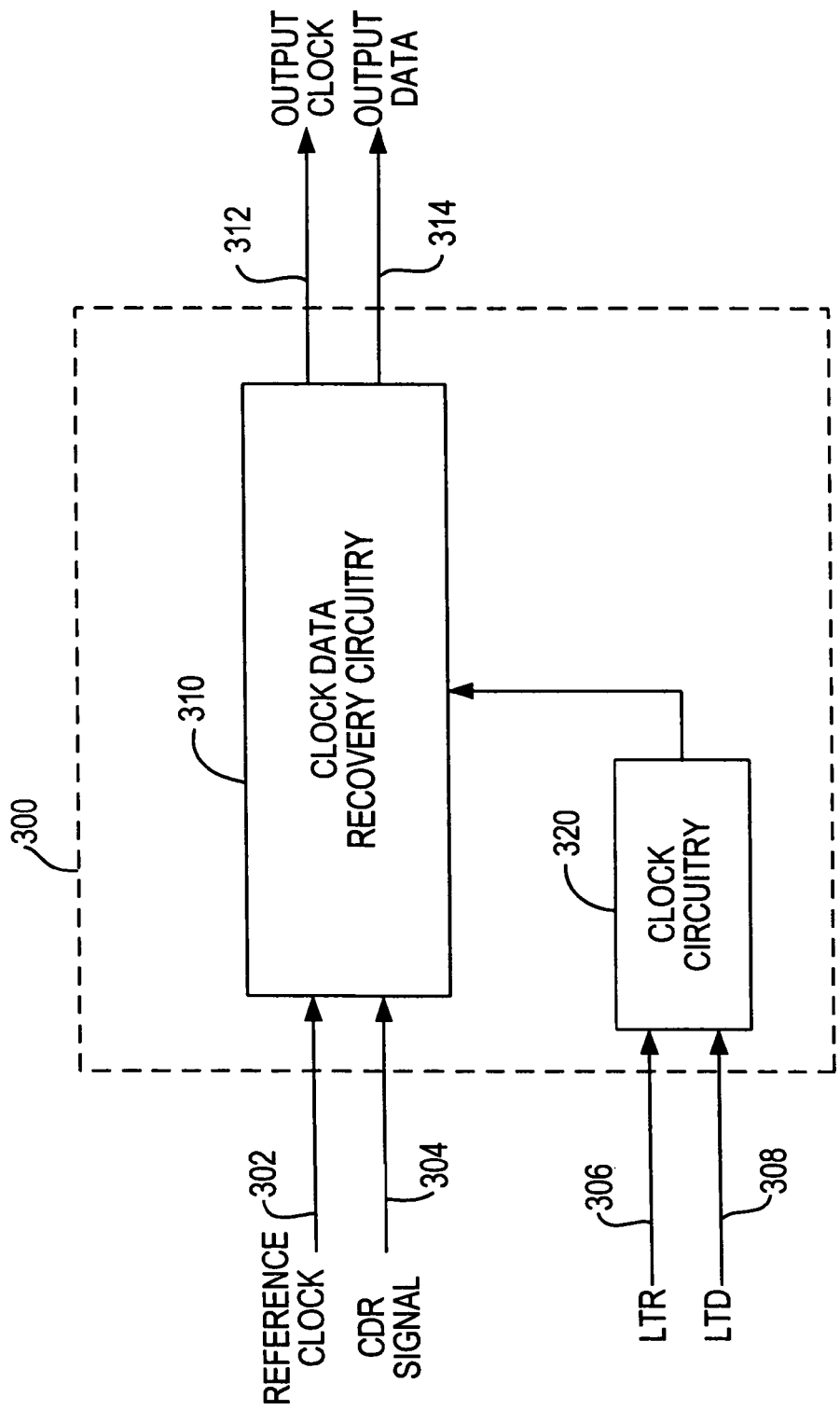
FIG. 3 is a simplified block diagram of receiver circuitry in a representative portion of the circuitry shown in FIG. 2 in accordance with one embodiment of the invention.

FIG. 3 illustrates a simplified block diagram of receiver circuitry 300. Receiver circuitry 300 includes CDR circuitry 310, which can include reference clock signal processing circuitry for processing data during reference clock mode and data recovery circuitry for processing data during data mode. CDR circuitry 310 receives as input a reference clock signal 302 and a CDR data signal 304. Although shown as single signals, reference clock signal 302 and CDR signal 304 can each be differential signals.

CDR circuitry 310 can be controlled by two signals: an LTR signal 306 and an LTD signal 308. LTR signal 306 and LTD signal 308 can be sent as input to control circuitry 320. Control circuitry 320 directs the processing of CDR circuitry 310 in one of reference clock mode or data mode. For example, when LTR signal 306 and LTD signal 308 are both set to logic 0, control circuitry 330 can direct the automatic processing of data in CDR circuitry 310 in reference clock mode and data mode. When LTR signal 306 is set to logic 1 and LTD signal 308 is set to logic 0, control circuitry 320 can direct CDR circuitry 310 to operate only in reference clock mode. When LTR signal 306 is set to either logic 0 or logic 1 and LTD signal 308 is set to logic 1, control circuitry 320 can direct CDR circuitry 310 to operate only in data mode.

Although not shown in FIG. 3, CDR circuitry 300 can include other suitable circuitry and signals that are used in connection with processing data during reference clock mode and data mode. CDR circuitry 310 can include, for example, control signals to direct the reset of some or all the circuitry, control signals to set circuitry to different values, and additional output signals that allow a programmable logic resource, circuitry external to the programmable logic resource, or a user to monitor the outputs during the different modes of data processing.

To perform data sampling and analysis of the CDR data signal within the programmable logic resource in accordance with the invention, LTR signal 306 and LTD signal 308 can be set so that CDR circuitry 310 operates in reference clock mode. Reference clock signal 302 can be sent as input to CDR circuitry 310 where signal 302 can be multiplied by a programmable or predetermined factor to generate a sampling rate signal. The sampling rate signal can be divided by another programmable or predetermined factor, representing the width of the sampled data, to generate an output clock signal 312. CDR data signal 304 can also be sent as input to CDR circuitry 310 where the signal is sampled at the sampling rate and generates an output data signal 314 based on output clock signal 312. Output data signal 314 can then be sent as input directly to, or via other circuitry to, the core circuitry which has dedicated circuitry configured to perform analysis on output data signal 314.

Figure 4:
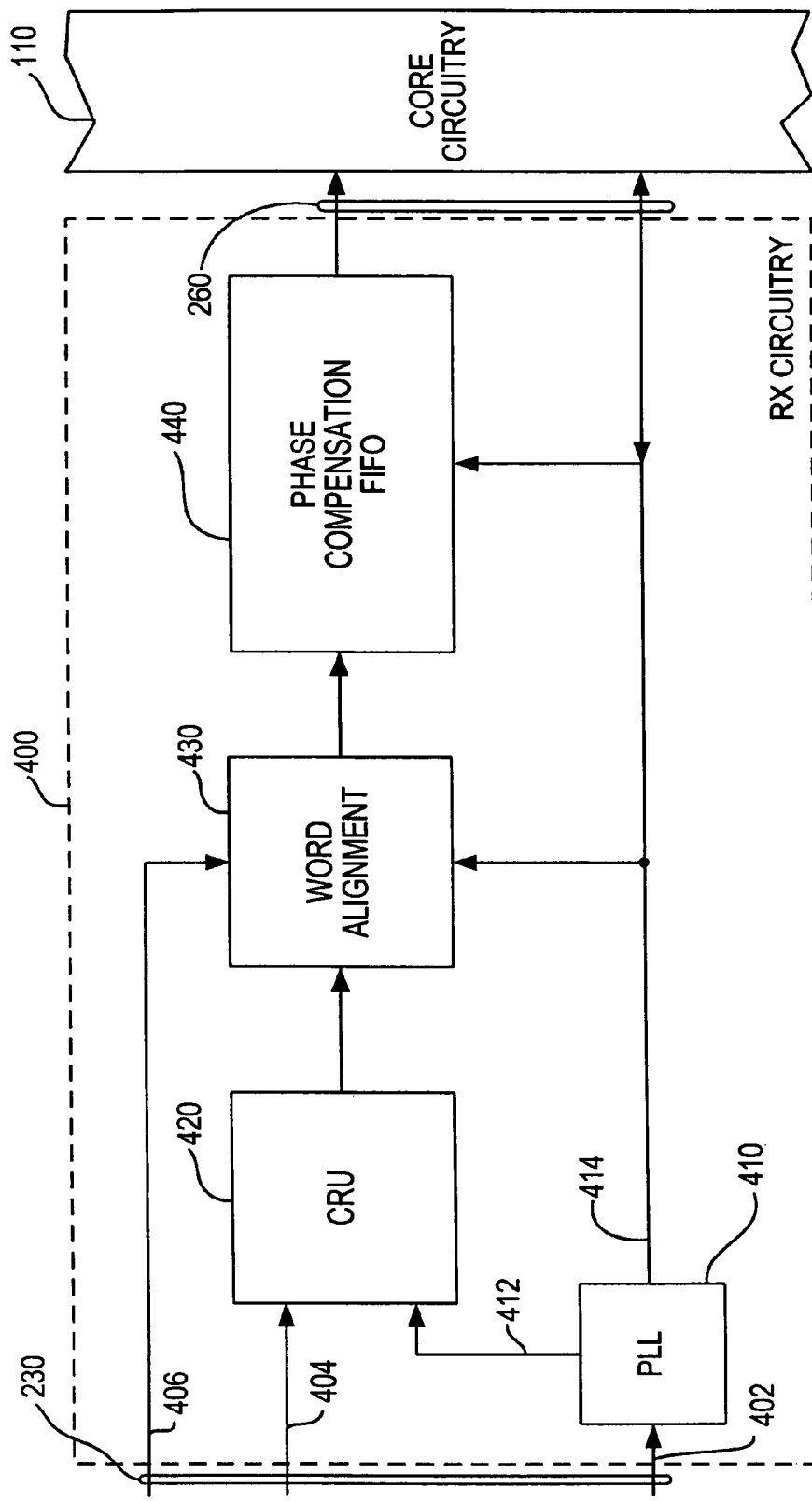
FIG. 4 is a simplified block diagram of receiver circuitry in a representative portion of the circuitry shown in FIG. 2 in accordance with one embodiment of the invention.

FIG. 4 illustrates a simplified block diagram of receiver circuitry 400. Receiver circuitry 400 includes a phase-locked loop (PLL) circuit 410, a clock recovery unit (CRU) 420, word alignment circuitry 430, and a phase compensation first-in first-out (FIFO) buffer 440.

When receiver circuitry 400 is in reference clock mode to sample data, PLL circuit 410 receives as input a reference clock signal 402 and multiplies signal 402 by a programmable or predetermined factor to generate signal 412 which represents the sampling rate. PLL circuit 410 also divides the sampling rate (i.e., signal 412) by another programmable or predetermined factor, representing the width of the sampled data, to generate signal 414 which is the output clock. As an illustrative example, reference clock signal may have a frequency of 156.25 Megahertz (MHz). If the multiplication factor is 20, the sampling rate sent as signal 412 would be 3.125 Gigabits per second (Gbps) (i.e., 3.125 GHz). If the width of the sampled data is to be 10 bits, the output clock sent as signal 414 would be 312.5 MHz. Alternatively, if the width of the sampled data is to be 20 bits, the output clock sent as signal 414 would be 156.25 MHz. The multiplication factor and division factor may be set by core circuitry 110, circuitry external to the programmable logic resource, user input, or any suitable combination thereof. The multiplication factor and division factor may be fixed for a given protocol or may be adjustable based on the input data.

CRU 420 samples data 404 (e.g., CDR data signal) at the sampling rate from signal 412. The sampled data is sent as input to word alignment circuitry 430 which also receives as input a bitslip control signal 406 and output clock signal 414. Bitslip control signal 406 slips one or more bits of the sampled data in order to properly align the sampled data. Bitslip control signal 406 may be set by core circuitry 110, circuitry external to the programmable logic resource, user input, or any suitable combination thereof. Word alignment circuitry 430 aligns the sampled data to the selected output width (e.g., 10 bits, 20 bits) and outputs the parallel data based on output clock signal 414. During reference clock mode, the aligned sampled data is bypassed through phase-compensation FIFO buffer 440 and to dedicated circuitry (not shown) in core circuitry 110 where the data can be analyzed.

In another embodiment, oversampling can be performed by utilizing more than one receiver channel to sample the CDR data signal at different phases from each other. The sampled data from both channels can be combined and analyzed by the dedicated circuitry. Oversampling provides a higher sampling rate and a greater degree of resolution, leading to greater accuracy in the analysis.

Figure 5:
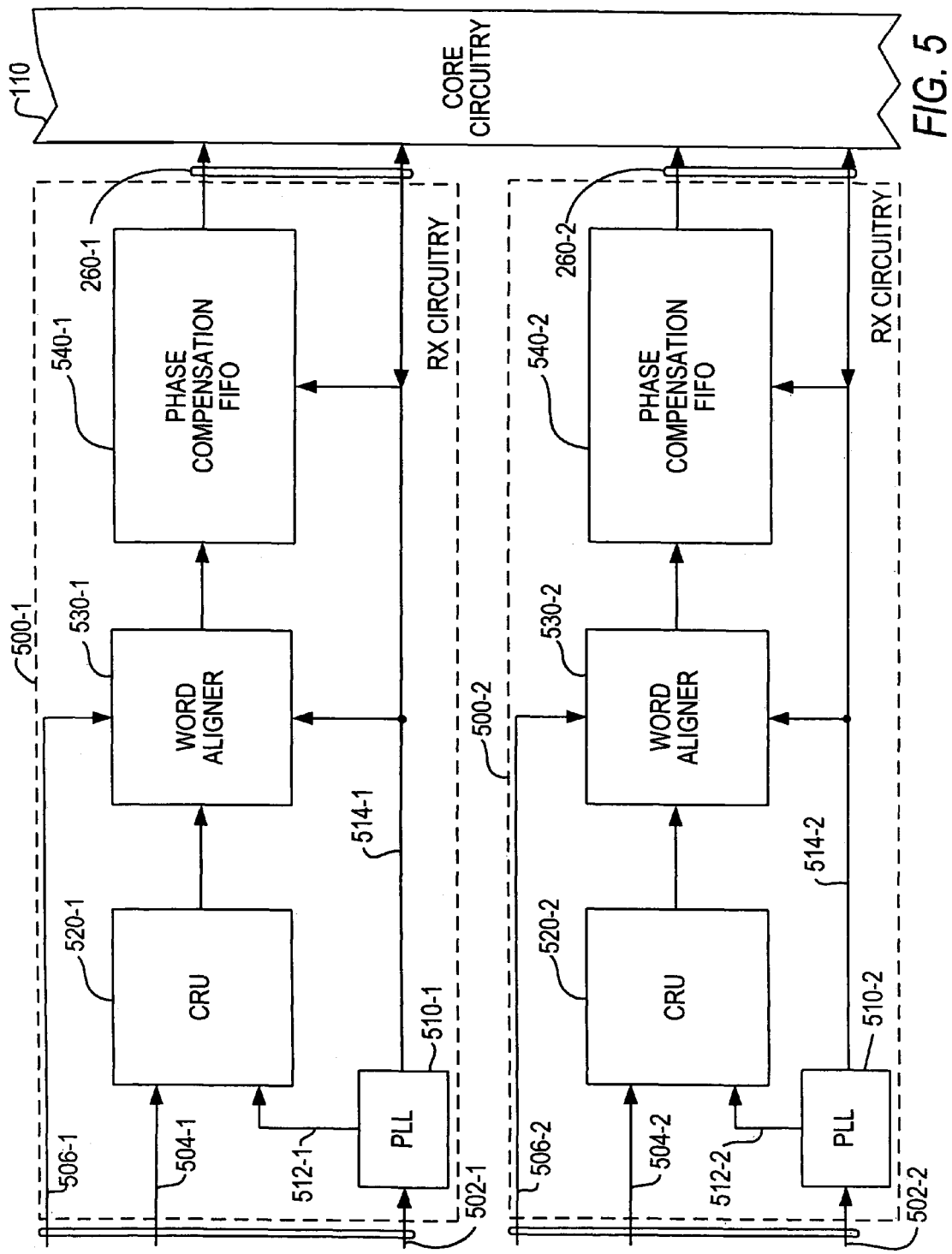
FIG. 5 is a simplified block diagram of receiver circuitry in a representative portion of the circuitry shown in FIG. 2 in accordance with another embodiment of the invention.

FIG. 5 illustrates a simplified block diagram of two receiver circuits 500 used to provide twice the amount of data samples. Receiver circuitry 500-1 can be in channel 210-1 while receiver circuitry 500-2 can be in channel 210-2, or any other suitable channel. Although FIG. 5 shows two receiver circuits 500, more than two receiver circuits 500 can be used to provide sampled data. Each receiver circuit 500 can include a PLL circuit 510, a CRU 520, word alignment circuitry 530, and a phase compensation FIFO buffer 540, which function similarly to the corresponding components shown and described in connection with FIG. 4.

Different receiver circuits 500 may operate in the same phase or a different phase from each other. Because the phase relationship between receiver circuits 500 is not known, prior to sampling data, receiver circuits 500 may have to be "trained" to operate in a specific relationship to one another. A same pulse, without any added phase delay, can be sent as input to CRUs 520 via signals 504. An automated circuit in core circuitry 110 can be used to bit slip the word alignment circuits 530 to align the data samples using respective bitslip control signals 506. After the samples are aligned, the pulse is phase-delayed one sampling clock period to determine the phase delay from the input pin of the programmable logic resource to core circuitry 110.

During data sampling, signals 504 are sent to respective receiver circuits 500 based on the determined phase relationship. For example, one signal 504-1 may be sent as input to CRU 520-1 while the other signal 504-2 may be phase delayed by the determined phase relationship before being sent as input to CRU 520-2. The sampled data between the receiver circuits 500 are then interposed, providing twice as many data samples for analysis in the dedicated circuitry in core circuitry 110. The sampled data can be interposed by using control circuitry to control when the sampled data leaves word alignment circuitry 530 and/or phase compensation FIFO circuitry 540 in each of receiver circuits 500. Alternatively, the routing and length of wires from the phase compensation FIFO buffers 540 to core circuitry 110 can vary. In both embodiments, or in the combination of both embodiments, the control circuitry and/or wiring can be such that the sampled data from one receiver circuit (e.g., 500-1) can arrive at core circuitry 110 a predetermined amount of time after the sampled data from another receiver circuit (e.g., 500-2) arrives at core circuitry 110.

The components in the receiver circuitry as shown in FIGS. 4 and 5 are merely illustrative. The receiver circuitry may include additional components (e.g., deskew FIFO buffer, clock compensation FIFO buffer, eight-bit ten-bit decoder, byte deserializer), fewer components, or a different arrangement of components.

Different types of analysis can be performed on the sampled data. For example, one type of analysis is time interval analysis (TIA) which measures the time between pulses. Another type of analysis is detecting the data width to look for patterns in the sampled data. With the detected patterns, finite impulse response (FIR) analysis, infinite impulse response (IIR) analysis, or any other suitable analysis can be performed on the data following the detected pattern.

With the analyzed data, the core circuitry can be configured to perform any suitable action. For example, existing CDR circuitry may not be able to recover data that has a low frequency. In accordance with the invention, sampling the CDR data signal can provide the core circuitry with enough information to re-align the CDR data signal so that the CDR circuitry is able to accurately recover the data.

Figure 6:
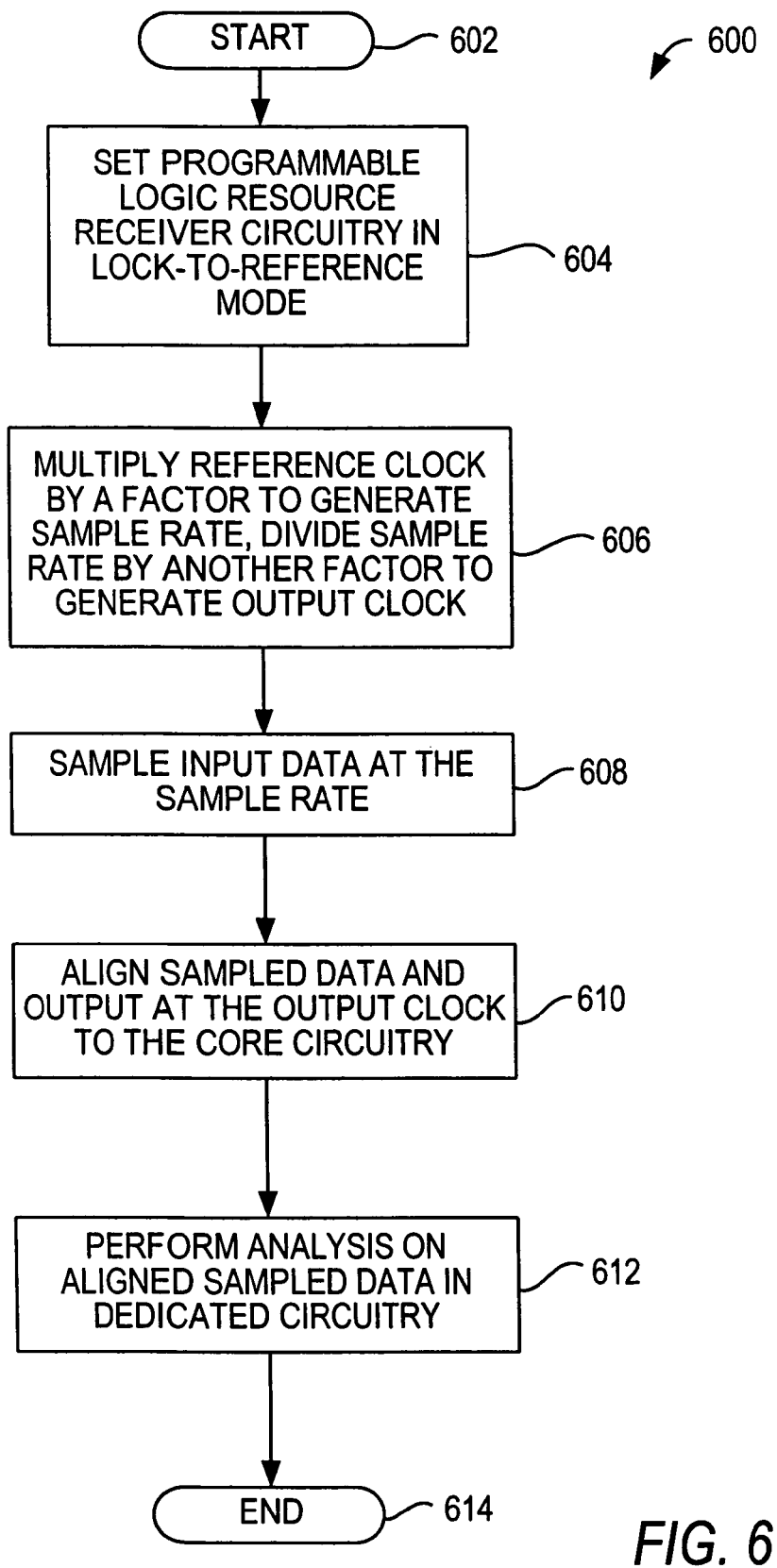
FIG. 6 is a flow diagram of data sampling in accordance with the invention.

FIG. 6 illustrates a flow diagram of data sampling. Process 600 begins at step 602. At step 604, programmable logic resource receiver circuitry 400/500 is set to operate in lock-to-reference mode (e.g., LTR signal 306 is set to binary "1" and LTD signal 308 is set to binary "0"). At step 606, PLL 410/510 multiplies the reference clock signal 402/502 by a factor to generate the sample rate 412/512. PLL 410/510 also divides the sample rate 412/512 by another factor (i.e., the desired width of the sampled data) to generate the output clock 414/514. The multiplication factor and the division factor can be programmable or predetermined, and can be set by the core circuitry 110 of programmable logic resource 100, by circuitry external to programmable logic resource 100, or by user input. At step 608, CRU 420/520 samples the input data 404/504 at the sample rate 412/512. At step 610, word alignment circuitry 430/530 aligns the sampled data for output to the core circuitry 110 based on the output clock 414/514. At step 612, dedicated circuitry in core circuitry 110 performs analysis on the aligned sampled data. The process ends at step 614.

Figure 7:
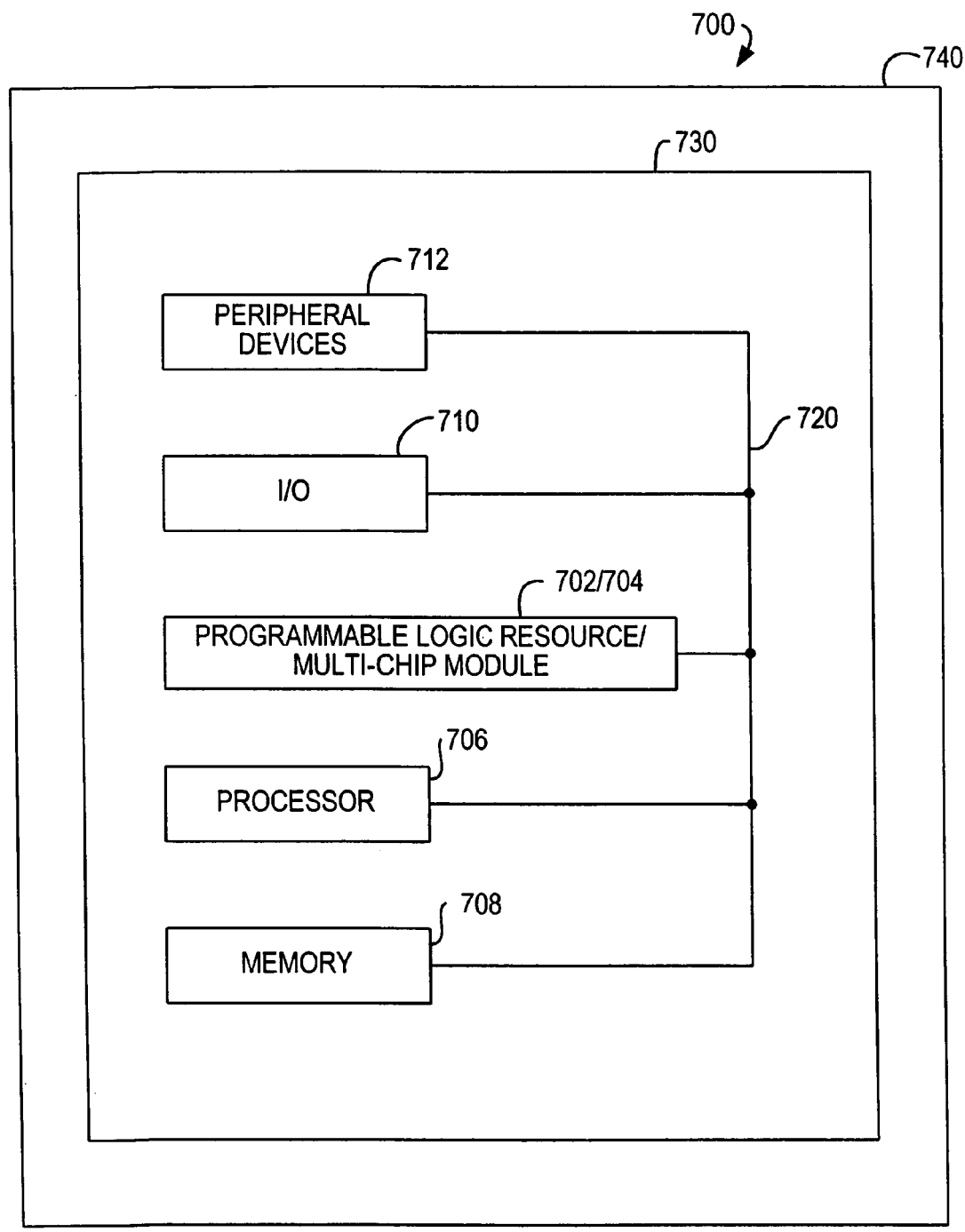
FIG. 7 is a simplified schematic block diagram of an illustrative system employing a programmable logic resource, multi-chip module, or other suitable device in accordance with the invention.

FIG. 7 illustrates a programmable logic resource (e.g., PLD, CPLD, EPLD, EEPLD, FPGA, ASSP, ASIC, full-custom chip, dedicated chip) 702, multi-chip module 704, or other device which includes embodiments of this invention in a data processing system 700. Data processing system 700 can include one or more of the following components: a processor 706, memory 708, I/O circuitry 710, and peripheral devices 712. These components are coupled together by a system bus or other interconnections 720 and are populated on a circuit board 730 which is contained in an end-user system 740.

System 700 can be used in a wide variety of applications, such as computer networking, data networking, instrumentation, video processing, digital signal processing, or any other application where the advantage of using programmable or reprogrammable logic is desirable. Programmable logic resource/module 702/704 can be used to perform a variety of different logic functions. For example, programmable logic resource/module 702/704 can be configured as a processor or controller that works in cooperation with processor 706. Programmable logic resource/module 702/704 may also be used as an arbiter for arbitrating access to a shared resource in system 700. In yet another example, programmable logic resource/module 702/704 can be configured as an interface between processor 706 and one of the other components in system 700. It should be noted that system 700 is only exemplary, and that the true scope and spirit of the invention should be indicated by the following claims.

Various technologies can be used to implement programmable logic resources 702 or multi-chip modules 704 having the features of this invention, as well as the various components of those devices (e.g., programmable logic connectors ("PLCs") and programmable function control elements ("FCEs") that control the PLCs). For example, each PLC can be a relatively simple programmable connector such as a switch or a plurality of switches for connecting any one of several inputs to an output. Alternatively, each PLC can be a somewhat more complex element that is capable of performing logic (e.g., by logically combining several of its inputs) as well as making a connection. In the latter case, for example, each PLC can be a product term logic, implementing functions such as AND, NAND, OR, or NOR. Examples of components suitable for implementing PLCs include EPROMs, EEPROMs, pass transistors, transmission gates, antifuses, laser fuses, metal optional links, etc. PLCs and other circuit components may be controlled by various, programmable, function control elements ("FCEs"). For example, FCEs can be SRAMS, DRAMS, magnetic RAMS, ferro-electric RAMS, first-in first-out ("FIFO") memories, EPROMS, EEPROMs, function control registers, ferro-electric memories, fuses, antifuses, or the like. From the various examples mentioned above it will be seen that this invention is applicable to both one-time-only programmable and reprogrammable resources.

Thus it is seen that sampling and analysis of data streams within the programmable logic resource without requiring the use of external equipment can be implemented. One skilled in the art will appreciate that the invention can be practiced by other than the prescribed embodiments, which are presented for purposes of illustration and not of limitation, and the invention is limited only by the claims which follow.

What is claimed is:

1. A method of sampling a serial data signal using first and second serial data receiver circuits on an integrated circuit comprising:
    applying first and second reference clock signals to the first and second receiver circuits, respectively;
    applying a pulse to the receiver circuits;
    in each of the receiver circuits, using a multiple of the respective reference clock signal to sample the pulse to produce a word that is a plurality of successive samples of the pulse;
    bitslipping the word in at least one of the receiver circuits to align the words in both receiver circuits;
    continuing to operate the receiver circuits with a data signal applied to both of the receiver circuits in place of the pulse, the data signal applied to the second receiver circuit being the same as, but delayed relative to, the data signal applied to the first receiver circuit; and
    interposing samples of the data signal from the first and second receiver circuits.

2. The method defined in claim 1 wherein each of the receiver circuits includes phase locked loop ("PLL") circuitry for receiving the respective reference clock signal, and wherein the method further comprises:
    using the PLL circuitry in each of the receiver circuits to multiply frequency of the respective reference clock signal by the multiple.

3. The method defined in claim 2 further comprising:
    using the PLL circuitry in each of the receiver circuits to produce a respective further clock signal for use in assembling the plurality of successive samples of the pulse into the respective word.

4. The method defined in claim 2 further comprising:
    holding the PLL circuitry in each of the receiver circuits in a lock to reference mode during the applying and the continuing so that phase of the multiple of the respective reference clock signal remains locked to phase of the respective reference clock signal.

5. The method defined in claim 1 wherein each of the receiver circuits includes word aligner circuitry, and wherein the method further comprises:
    using the word aligner circuitry in each of the receiver circuits to assemble the respective plurality of successive samples of the pulse into the respective word.

6. The method defined in claim 5 further comprising:
    further using the word aligner circuitry in at least one of the receiver circuits to bitslip the respective word in the bitslipping.

7. The method defined in claim 5 wherein each of the receiver circuits further includes phase compensation FIFO circuitry downstream from the respective word aligner circuitry but upstream from still further circuitry, and wherein the method further comprises:
    bypassing the phase compensation FIFO circuitry in each of the receiver circuits during the applying and the continuing.

8. The method defined in claim 1 wherein the interposing results in providing twice as many samples of the data signal for analysis as would result from using only one of the receiver circuits.

9. The method defined in claim 1 wherein the integrated circuit includes (1) a hard intellectual property block, and (2) programmable logic core circuitry, and wherein the method further comprises:
    using the hard intellectual property block to produce the samples of the pulse and assemble those samples into the words; and
    applying the words to the programmable logic core circuitry.

10. The method defined in claim 1 wherein the interposing comprises:
    in each of the receiver circuits, assembling a plurality of successive samples of the data signal taken in the respective channels into a respective data word.

11. The method defined in claim 10 wherein the integrated circuit includes programmable logic core circuitry, and wherein the interposing further comprises:
    applying the data words to the programmable logic core circuitry; and
    using the programmable logic core circuitry to interpose samples from the data words.

12. The method defined in claim 11 wherein the integrated circuit further includes a hard intellectual property block, and wherein the method further comprises:
    using receiver circuits in the hard intellectual property block as the first and second receiver circuits.

* * * * *